(12) United States Patent  
Braganca et al.

(10) Patent No.: US 9,099,115 B2  
(45) Date of Patent: Aug. 4, 2015

(54) MAGNETIC SENSOR WITH DOPED FERROMAGNETIC CAP AND/OR UNDERLAYER

(71) Applicant: HGST Netherlands B.V., Amsterdam (NL)

(72) Inventors: Patrick M. Braganca, San Jose, CA (US); Jeffrey R. Childress, San Jose, CA (US); John C. Read, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 77 days.

(21) Appl. No.: 14/078,410

(22) Filed: Nov. 12, 2013

(65) Prior Publication Data

US 2015/0131179 A1    May 14, 2015

(51) Int. Cl.  
*G11B 5/31* (2006.01)  
*G11B 5/84* (2006.01)

(52) U.S. Cl.  
CPC ............... *G11B 5/3143* (2013.01); *G11B 5/84* (2013.01)

(58) Field of Classification Search  
CPC ....... G11B 5/3143; G11B 5/84; G11B 5/3929  
USPC ............... 360/324, 324.1, 324.11, 324.12  
See application file for complete search history.

(56) References Cited

U.S. PATENT DOCUMENTS

| | | | |
|---|---|---|---|
| 5,949,622 A * | 9/1999 | Kamiguchi et al. | 360/324.12 |
| 6,046,892 A | 4/2000 | Aoshima et al. | |
| 6,338,899 B1 * | 1/2002 | Fukuzawa et al. | 360/324.12 |
| 6,709,767 B2 | 3/2004 | Lin et al. | |
| 6,785,099 B2 | 8/2004 | Lee et al. | |
| 6,806,804 B2 * | 10/2004 | Saito et al. | 336/200 |
| 7,149,062 B2 | 12/2006 | Pinarbasi et al. | |
| 7,186,470 B2 * | 3/2007 | Gill et al. | 428/811.5 |
| 7,277,260 B2 | 10/2007 | Gill et al. | |
| 7,961,440 B2 | 6/2011 | Gill et al. | |
| 8,164,862 B2 | 4/2012 | Zhang et al. | |
| 8,169,753 B2 | 5/2012 | Lin | |
| 8,233,247 B2 | 7/2012 | Carey et al. | |
| 8,238,063 B2 | 8/2012 | Qiu et al. | |
| 8,259,420 B2 * | 9/2012 | Zhao et al. | 360/324.12 |
| 8,953,285 B2 * | 2/2015 | Zhou et al. | 360/324.12 |
| 2007/0211392 A1 | 9/2007 | Zeltser | |
| 2009/0161268 A1 | 6/2009 | Lin | |
| 2012/0164485 A1 | 6/2012 | Lin | |
| 2014/0145792 A1 * | 5/2014 | Wang et al. | 331/94.1 |

* cited by examiner

*Primary Examiner* — Angel Castro  
(74) *Attorney, Agent, or Firm* — Zilka-Kotab, PC

(57) ABSTRACT

A magnetic head according to one embodiment includes an underlayer, a first nonmagnetic spacer layer above the underlayer, a free layer above the first nonmagnetic spacer layer, a second nonmagnetic spacer layer above the free layer, and a cap layer above the second nonmagnetic spacer layer. At least one of the cap layer and the underlayer comprises a soft ferromagnetic material and a high spin orbit coupling material. Other embodiments are also described.

20 Claims, 6 Drawing Sheets

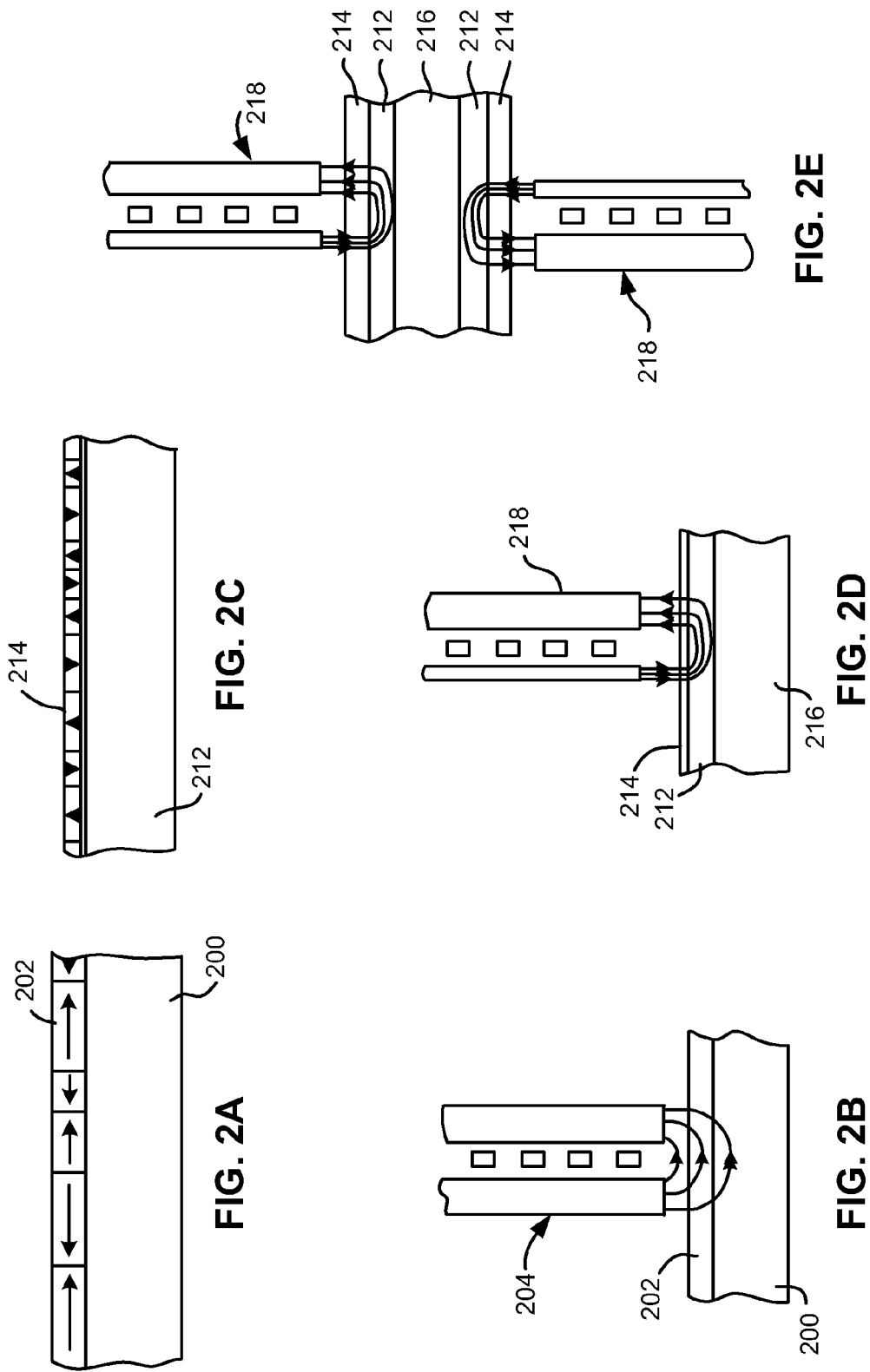

MAGNETIC SENSOR WITH DOPED FERROMAGNETIC CAP AND/OR UNDERLAYER

FIELD OF THE INVENTION

The present invention relates to data storage systems, and more particularly, this invention relates to magnetic sensors having a doped ferromagnetic cap and/or underlayer for improved performance of said magnetic sensors.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. For example, as read sensor trackwidth dimensions decrease, it is desirable to also reduce the spacing between the magnetic shields of the sensor as well, e.g., to improve resolution. However, this spacing between the magnetic shields, also known as the read gap, has become increasingly difficult to reduce, as the individual layers of the sensor have thickness limits to ensure tolerable sensor signal and magnetic stability.

SUMMARY

A magnetic head according to one embodiment includes an underlayer, a first nonmagnetic spacer layer above the underlayer, a free layer above the first nonmagnetic spacer layer, a second nonmagnetic spacer layer above the free layer, and a cap layer above the second nonmagnetic spacer layer. At least one of the cap layer and the underlayer comprises a soft ferromagnetic material and a high spin orbit coupling material.

A magnetic head according to one embodiment includes an underlayer, a first nonmagnetic spacer layer above the underlayer, a free layer above the first nonmagnetic spacer layer, a second nonmagnetic spacer layer above the free layer, and a cap layer above the second nonmagnetic spacer layer. At least one of the cap layer and the underlayer comprises a soft ferromagnetic material and a high spin orbit coupling material, wherein the high spin orbit coupling material is selected from a group consisting of Dy, Tb, Ir, Pt, Pd, Os, Ho, Gd, Er, W, Rh, and alloys containing said materials. The high spin orbit coupling material is present in the at least one of the cap layer and the underlayer at 1 to about 10 at %.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic-based storage systems and/or related systems and methods implementing a sensor stack with an underlayer and/or cap having a soft ferromagnetic material that is doped with materials exhibiting high spin orbit coupling properties, as well as operation and/or component parts thereof. In doing so, various embodiments described and/or suggested herein preferably reduce the read gap, thereby improving functionality and accuracy of the corresponding structures, as will be described in detail below.

In one general embodiment, a magnetic head includes an underlayer, a first nonmagnetic spacer layer above the underlayer, a free layer above the first nonmagnetic spacer layer, a second nonmagnetic spacer layer above the free layer, and a cap layer above the second nonmagnetic spacer layer. At least one of the cap layer and the underlayer comprises a soft ferromagnetic material and a high spin orbit coupling material.

In another general embodiment, a magnetic head includes an underlayer, a first nonmagnetic spacer layer above the underlayer, a free layer above the first nonmagnetic spacer layer, a second nonmagnetic spacer layer above the free layer, and a cap layer above the second nonmagnetic spacer layer. At least one of the cap layer and the underlayer comprises a soft ferromagnetic material and a high spin orbit coupling material, wherein the high spin orbit coupling material is selected from a group consisting of Dy, Tb, Ir, Pt, Pd, Os, Ho, Gd, Er, W, Rh, and alloys containing said materials. The high spin orbit coupling material is present in the at least one of the cap layer and the underlayer at 1 to about 10 at %.

Figure 1:
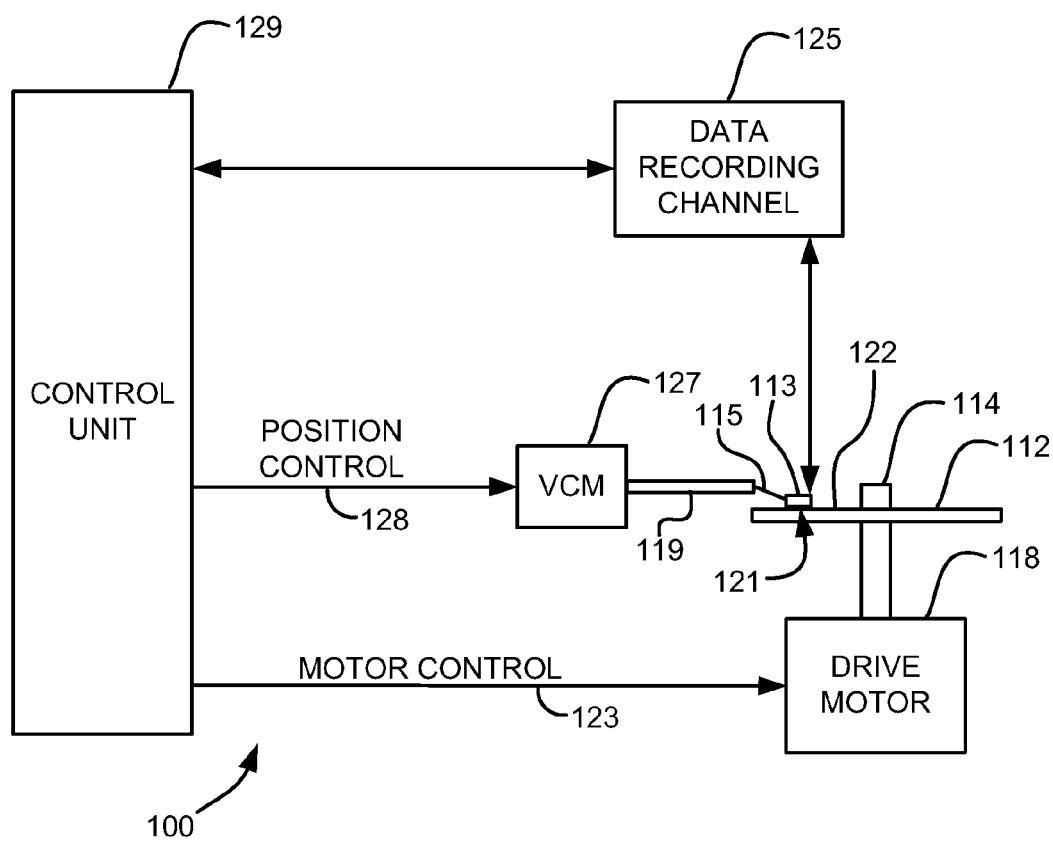
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
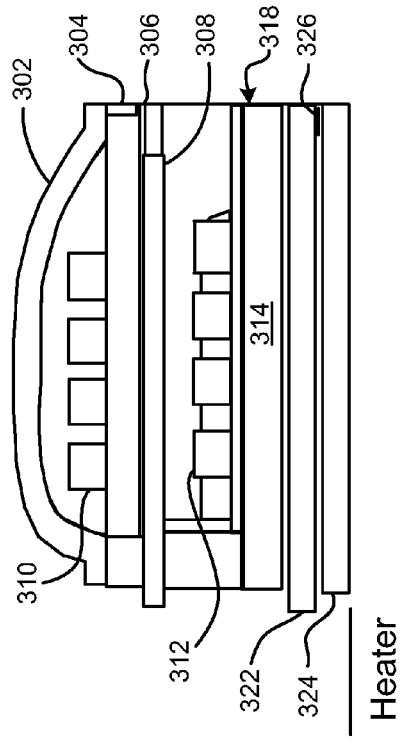
FIG. 3B is a cross-sectional view of one particular embodiment of a piggyback magnetic head with helical coils.
Figure 3A:
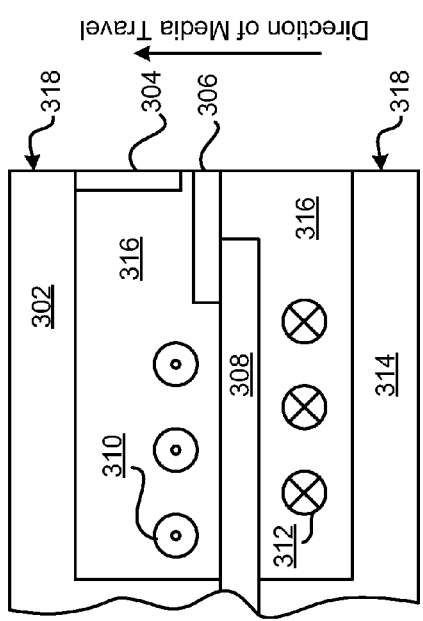
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
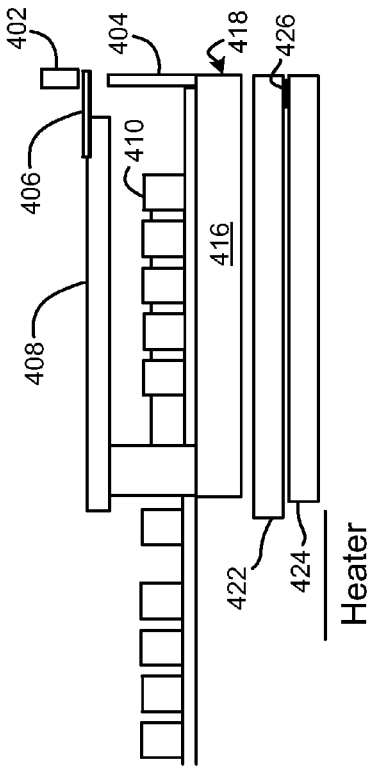
FIG. 4B is a cross-sectional view of one particular embodiment of a piggyback magnetic head with looped coils.
Figure 4A:
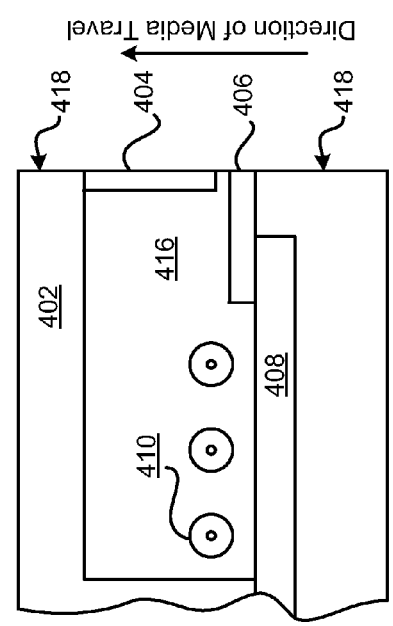
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

As mentioned above, various embodiments herein may implement a sensor stack with an underlayer and/or cap having a soft ferromagnetic material that is doped with materials exhibiting high spin orbit coupling properties. In doing so, the read gap of such embodiments may be desirably reduced, thereby improving functionality and accuracy of the corresponding structures, as will soon become apparent.

Prior to the present discovery, it was deemed undesirable to employ magnetic materials for the layers of the sensor stack adjacent the shields in an attempt to reduce the size of the read gap. While the magnetic layers become magnetically coupled to the bulk shields and reduce the effective distance between the shields and the magnetically sensitive layers of the sensor stack therebetween (e.g., the free layer), unfortunately in doing so, spin torque due to electric current, which is spin polarized by the shields, destabilizes the magnetically sensitive layers of the sensor stack, and actually decreases the signal to noise ratio (SNR).

Additionally, the spin torque acting from the top shield on the free layer may reduce the functionality of the sensor in some cases. As a result, the functionality of such contemplated structure may be compromised and/or rendered useless altogether. Thus such contemplated structures are deemed undesirable.

In sharp contrast, various embodiments described and/or suggested herein preferably involve a sensor stack with an underlayer and/or cap having a soft ferromagnetic material that is doped with materials exhibiting high spin orbit coupling properties. By doped with materials exhibiting high spin orbit coupling properties, what is meant is that the materials exhibiting high spin orbit coupling properties are dispersed in the bulk soft ferromagnetic material and/or laminated with the soft ferromagnetic material.

Furthermore, these underlayers and/or cap layers may additionally be patterned during sensor processing and effectively become an extension of the bulk shields, thereby achieving a reduced read gap, as will be discussed in further detail below. Such structures do not suffer from the drawbacks noted above.

Figure 5:
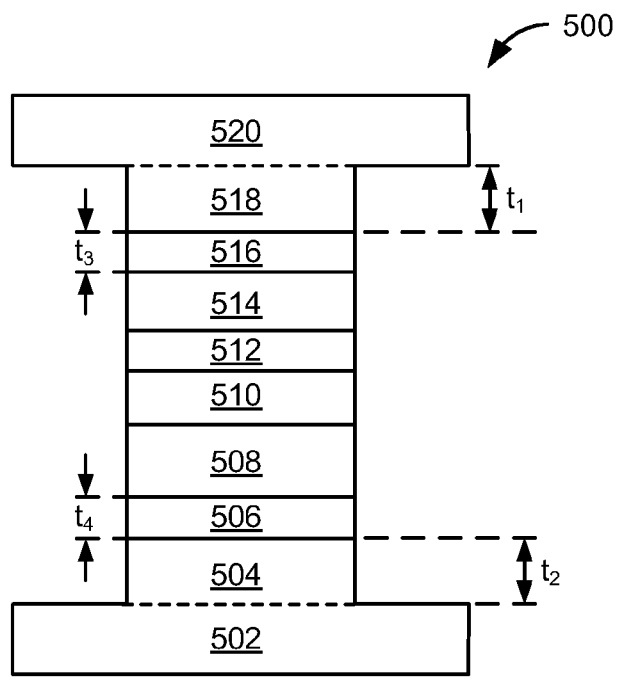
FIG. 5 is a partial cross-sectional view of a magnetic head according to one embodiment.

FIG. 5 depicts a magnetic head 500, in accordance with one embodiment. As an option, the present magnetic head 500 may be implemented in conjunction with features from any other embodiment listed herein, such as those described with reference to the other FIGS. Of course, however, such magnetic head 500 and others presented herein may be used in various applications and/or in permutations which may or may not be specifically described in the illustrative embodiments listed herein. Further, the magnetic head 500 presented herein may be used in any desired environment.

Referring now to FIG. 5, the magnetic head 500 includes a lower shield 502 and an underlayer 504 above the lower shield 502. Additionally, the magnetic head 500 includes an optional nonmagnetic spacer layer 506, antiferromagnetic (AFM) layer 508, reference layer 510, spacer layer 512, and free layer 514 positioned above the underlayer 504. A cap layer 518 is also included above the free layer 514, and preferably separated therefrom by a nonmagnetic spacer layer 516. Moreover, an upper shield 520 may additionally be positioned above the cap layer 518, as illustrated in FIG. 5.

In this and other embodiments, the materials used to form the various layers may be conventional, except as otherwise described herein. For example, the spacer layer 512 may include a conductive metal for a current-perpendicular-to-plane (CPP) sensor design, a tunnel barrier material for a magnetoresistive tunnel junction (MTJ) sensor design, etc.

In various approaches, the lower and/or upper shield 502, 520 may include a soft magnetic material, depending on the desired embodiment. The soft ferromagnetic material may include, but is not limited to, Ni, Fe, Co, etc., and/or alloys thereof (e.g., NiFe, CoZr, CoTa, CoNb, CoFe, CoFeAl, FeSiAl (sendust), etc.

Similarly, according to various approaches, at least one of the cap layer 518 and the underlayer 504 may include a soft ferromagnetic material and/or a high spin orbit coupling material. However, in preferred approaches, the cap layer 518 and/or the underlayer 504 include both a soft ferromagnetic material and a high spin orbit coupling material, as will soon become apparent.

Soft ferromagnetic materials such as those listed above may be used in the cap layer 518 and/or the underlayer 504. Note also that a soft ferromagnetic material is generally characterized by a property that the magnetic moment thereof rotates, pivots, or otherwise changes orientation under the influence of an external magnetic field applied thereto at room temperature.

According to different approaches, a high spin orbit coupling material may be defined as any material that increases spin flip scattering in the bulk material by increasing spin orbit coupling. In various approaches, the high spin orbit coupling material may include, but is not limited to, Dy, Tb, Ir, Pt, Pd, Os, Ho, Gd, Er, W, Rh, etc., and/or combinations thereof, e.g., alloys containing said materials.

By adding a soft ferromagnetic material to the cap layer 518 and/or the underlayer 504, the upper shield 520 and/or lower shield 502 may become directly magnetically coupled to the cap layer 518 and/or the underlayer 504, respectively. Thus, as described above, the cap layer 518 and/or the underlayer 504 may act as a magnetic extension of the upper shield 520 and/or lower shield 502. Moreover, the nonmagnetic spacer layers 506, 516 preferably decouple the cap layer 518 and/or the underlayer 504 from the reference layer 510 and free layer 514 thereby ensuring functionality of the magnetic head. According to various approaches, one or both of the nonmagnetic spacer layers 506, 516 may include Ru, Cu, Ag, etc.

As described above, in preferred embodiments, the cap layer 518 and/or the underlayer 504 may include both a soft ferromagnetic material and a high spin orbit coupling material. In such embodiments having both a soft ferromagnetic material and a high spin orbit coupling material, the ferromagnetic material is preferably doped with the high spin orbit coupling material. By doping the soft ferromagnetic material of the cap layer 518 and/or the underlayer 504 with a high spin orbit coupling material, spin-flip scattering in the underlayer 504 and/or cap layer 518 is preferably increased, thereby reducing the spin polarized electric current from the upper and/or lower shields 520, 502 that may otherwise destabilize the free and/or reference layers if left uncompensated.

Thus, with continued reference to the magnetic head 500 of FIG. 5, in some embodiments, the upper shield 520 may also include a high spin orbit coupling material, e.g., added as a dopant to the soft ferromagnetic material of the upper shield 520, as will soon become apparent. Moreover, according to various approaches, the high spin orbit coupling material added to the upper shield 520 may include any of the materials listed above.

In one approach, the high spin orbit coupling material may be added to the ferromagnetic material as a dopant, using co-deposition. Accordingly, the high spin orbit coupling material and the ferromagnetic material may be co-deposited from separate targets. However, according to another approach, the high spin orbit coupling material and the ferromagnetic material may be deposited from a single target, as will be described in further detail below.

With continued reference to FIG. 5, according to various approaches, the cap layer 518 may have a thickness $t_1$ from about 10 angstroms (Å) to about 60 Å, more preferably from about 20 Å to about 40 Å, but could be higher or lower, depending on the desired embodiment. Moreover, the underlayer 504 may have a thickness $t_2$ from about 10 Å to about 60 Å, more preferably from about 40 Å to about 50 Å, but could be higher or lower. Thus, in different embodiments, the thickness $t_1$, $t_2$ of the cap layer 518 and the underlayer 504 may be the same, similar or different values, depending on the desired embodiment. It should be noted that, as used herein, the term "about" with reference to some stated value refers to the stated value ±10% of said value. Furthermore, the nonmagnetic spacer layers 506, 516 may have a thickness $t_3$, $t_4$ respectively, from about 10 Å to about 30 Å, or higher or lower, depending on the desired embodiment.

As mentioned above, a high spin orbit coupling material may be present in the cap layer 518 and/or the underlayer 504. Depending on the desired embodiment, the high spin orbit coupling material may be present at about 1 at % to about 10 at %, but could be higher or lower. It should also be noted that, depending on the embodiment, the at % of the high spin orbit coupling material in a given layer may be based either on the bulk of the respective layer, or the layer/sub-layer in which the high spin orbit coupling material may be added as a dopant.

As alluded to above, the cap layer 518 and/or the underlayer 504 preferably include both a ferromagnetic material and a high spin orbit coupling material, which may be formed by incorporating different methods, e.g., having different process steps. As an option, the different methods may be implemented in conjunction with features from any other embodiment listed herein, such as those described with reference to the other FIGS. Of course, however, such methods and others presented herein may be used in various applications and/or in permutations which may or may not be specifically described in the illustrative embodiments listed herein. Further, the methods presented herein may be used in any desired environment. Thus the methods described below (and throughout the present application) should be deemed to include any and all possible permutations.

According to an illustrative embodiment, a method of forming an underlayer 504 and/or a cap layer 518 having both a ferromagnetic material and a high spin orbit coupling material may include incorporating co-deposition of the materials. In various approaches, the co-deposition of the ferromagnetic and high spin orbit coupling materials may be performed by incorporating sputtering, plasma vapor deposition PVD, chemical vapor deposition CVD, etc.

According to one approach, the method of forming the underlayer 504 and/or the cap layer 518 may include co-depositing the ferromagnetic material and the high spin orbit coupling material from the same target, e.g., a single target having the co-deposited materials therein. However, in another approach, the method may include co-depositing the ferromagnetic material and the high spin orbit coupling material from different targets, e.g., two distinct targets. Thus, in some embodiments, the high spin orbit coupling material and the ferromagnetic material may be interspersed throughout the cap layer 518 and/or the underlayer 504, e.g., preferably about evenly.

In other approaches, the method of forming the underlayer 504 and/or the cap layer 518 may include sequentially depositing the ferromagnetic material and the high spin orbit coupling material, thereby forming a laminate structure in the underlayer 504 and/or the cap layer 518. Therefore, the ferromagnetic and high spin orbit coupling materials may be deposited in several thin layers, preferably alternating therebetween. Therefore, the ferromagnetic and high spin orbit coupling materials may be present in alternating layers in a laminate structure, e.g., throughout the cap layer 518 and/or the underlayer 504.

Moreover, in yet further approaches, the high spin orbit coupling material and/or the ferromagnetic material may be deposited in different combinations and/or configurations, e.g., a portion of the cap layer 518 and/or the underlayer 504 may include the ferromagnetic and high spin orbit coupling materials interspersed therein, while another portion of the cap layer 518 and/or the underlayer 504 may include the materials deposited in several thin, alternating layers as described above, depending on the desired embodiment.

Although the magnetic cap 518 and underlayer 504 are illustrated as being single layers in FIG. 5, in other approaches, a magnetic head may include magnetic caps and/or underlayers having multiple layers, e.g., including a multilayer structure.

Figure 6:
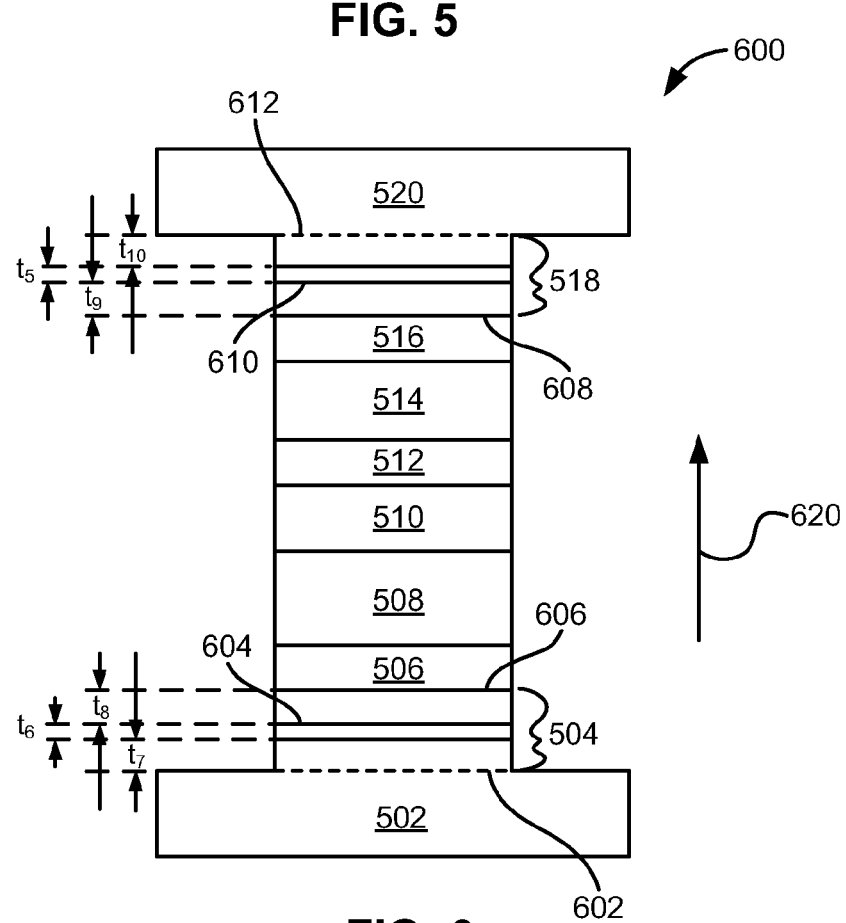
FIG. 6 is a partial cross-sectional view of a magnetic head according to one embodiment.

FIG. 6 depicts a magnetic head 600 having anti-parallel coupled structures, in accordance with another embodiment. According to an illustrative approach, the anti-parallel coupled structures may be present in the magnetic head 600 in order to further decouple the field interactions between the patterned magnetic underlayers and cap 504, 518 and the free and/or reference layers 514, 510, respectively, as will be described in further detail below.

As an option, the present magnetic head 600 may be implemented in conjunction with features from any other embodiment listed herein, such as those described with reference to the other FIGS. Of course, however, such magnetic head 600 and others presented herein may be used in various applications and/or in permutations which may or may not be specifically described in the illustrative embodiments listed herein. Further, the magnetic head 600 presented herein may be used in any desired environment.

The magnetic head 600 of FIG. 6 includes a lower shield 502 and an underlayer 504 above the lower shield 502. Additionally, the magnetic head 600 includes a nonmagnetic spacer layer 506, antiferromagnetic (AFM) layer 508, reference layer 510, spacer layer 512, and free layer 514 above the underlayer 504. With continued reference to FIG. 6, a cap layer 518 is included above the free layer 514 and preferably separated therefrom by a nonmagnetic spacer layer 516. Furthermore above cap layer 518, the magnetic head 500 also includes an upper shield 520.

As illustrated, both the cap layer 518 and the underlayer 504 include an anti-parallel (AP) coupled structure. Furthermore, according to the illustrative embodiment, each of the AP coupled structures has two ferromagnetic sub-layers 602, 606 and 608, 612, respectively, which are separated by an anti-parallel coupling layer 604, 610, respectively. It should be noted that although both the cap layer 518 and the underlayer 504 are shown as including an AP coupled structure, in other embodiments, only one of the cap layer 518 and the underlayer 504 may include an AP coupled structure. Furthermore, in other approaches, the AP coupled structures of the cap layer 518 and/or the underlayer 504 may include at least two layers, at least three layers, multiple layers, etc., depending on the desired embodiment.

The pairs of ferromagnetic sub-layers 602, 606 and 608, 612, respectively, preferably have magnetic moments oriented antiparallel to each other, e.g., induced by the antiparallel coupling layers 604, 610. Thus, according to the present description, the ferromagnetic sub-layers pairs 602, 606 and 608, 612 may have a magnetic orientation substantially antiparallel to each other, i.e., oriented substantially 180 degrees apart, but could be higher or lower depending on the desired embodiment.

According to various approaches, the ferromagnetic sub-layers 602, 606, 608, 612 may include any of the soft ferromagnetic materials and/or alloys thereof described above with reference to FIG. 5. Thus, the ferromagnetic sub-layers 602, 606, 608, 612 of FIG. 6 may include Ni, Fe, Co, etc., and/or alloys thereof (e.g., NiFe, CoZr, CoTa, CoNb, CoFe, etc.), depending on the desired embodiment. As a result, the sub-layers 602, 612 may be directly magnetically coupled to the nearest shield 502, 520, respectively, while sub-layers 606, 608 are indirectly coupled to the nearest shield through the anti-parallel coupling layers 604, 610 and sub-layers 602, 612. Moreover, it should be noted that in different embodiments, the ferromagnetic sub-layers 602, 606, 608, 612 may include the same, similar or different materials and/or dimensions relative to one another.

The sub-layers 602, 606, 608, 612 also preferably include a high spin orbit coupling material, e.g., as a dopant dispersed in the soft ferromagnetic materials of the sub-layers 602, 606, 608, 612 and/or as layers of high spin orbit coupling material laminated with magnetic material. As described above, by doping the soft ferromagnetic materials of the cap layer 518 and/or the underlayer 504 with a high spin orbit coupling material, spin-flip scattering in the cap layer 518 and/or underlayer 504 is preferably increased, thereby reducing the spin polarized electric current from the upper and/or lower shields 520, 502 that may otherwise destabilize the free and/or reference layers if left uncompensated.

According to different approaches the sub-layers 602, 606, 608, 612 may have a thickness $t_7$, $t_8$, $t_9$, $t_{10}$ respectfully, in the deposition direction 620 from about 20 Å to about 30 Å, but could be higher or lower.

According to preferred approaches, the anti-parallel coupling layers 610, 604 may include Ru. However, in other approaches, one or more of the anti-parallel coupling layers 610, 604 may include Ag, Cu, etc., depending on the preferred embodiment. Furthermore, the anti-parallel coupling layers 610, 604 may have a thickness $t_5$, $t_6$ from about 4 Å to about 14 Å, more preferably from about 6 Å to about 10 Å, but could be higher or lower, depending on the desired embodiment.

Although the upper shield 520 of FIG. 6 is shown as a single layer, according to other approaches, the upper shield 520 may include an anti-parallel coupled structure, as will soon become apparent.

Figure 7:
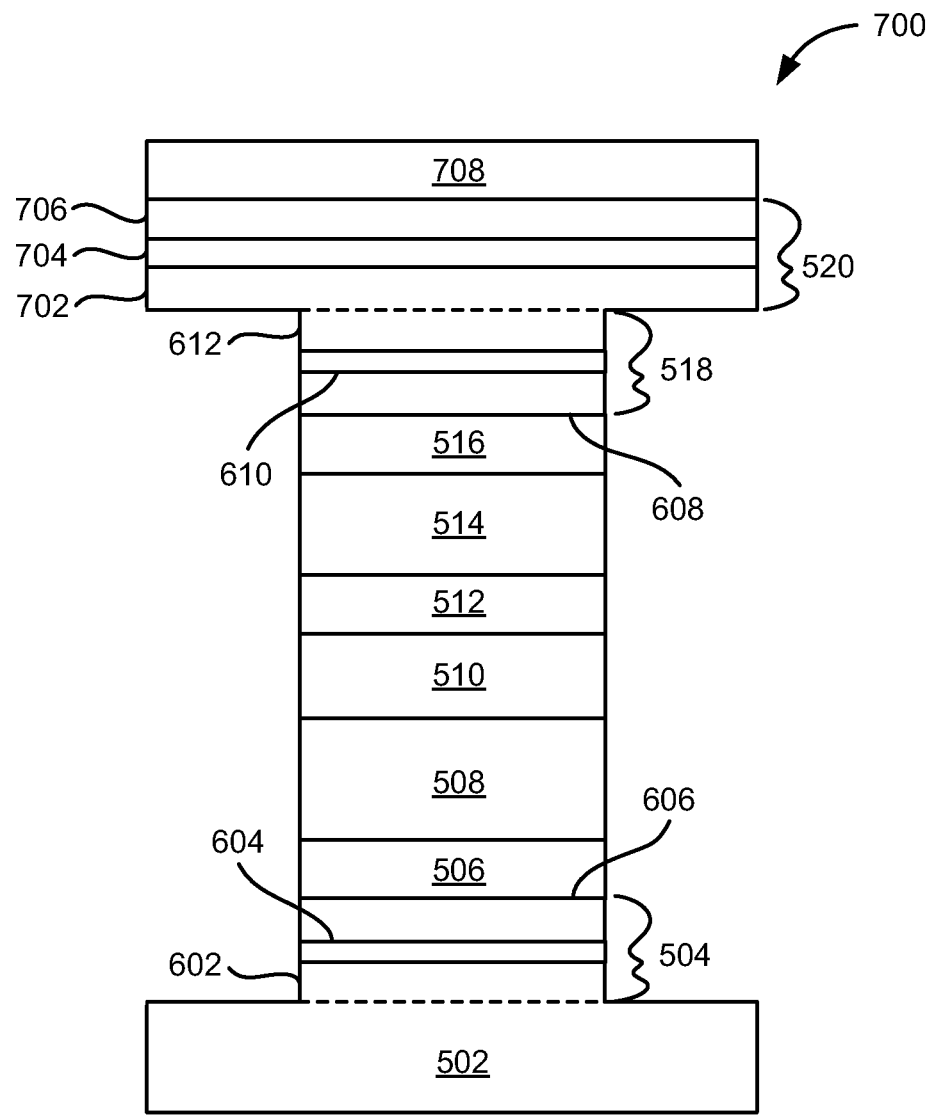
FIG. 7 is a partial cross-sectional view of a magnetic head according to one embodiment.

FIG. 7 depicts a magnetic head 700, in accordance with another embodiment. As an option, the present magnetic head 700 may be implemented in conjunction with features from any other embodiment listed herein, such as those described with reference to the other FIGS. Of course, however, such magnetic head 700 and others presented herein may be used in various applications and/or in permutations which may or may not be specifically described in the illustrative embodiments listed herein. Further, the magnetic head 700 presented herein may be used in any desired environment.

It should be noted that the magnetic head 700 illustrates a variation of the embodiment of FIG. 6 depicting an alternative exemplary configuration of the upper shield 520. Accordingly, various components of FIG. 7 have common numbering with those of FIG. 6.

Referring now to FIG. 7, the upper shield 520 of the magnetic head 700 includes an AP coupled structure, having two ferromagnetic sub-layers 702, 706 separated by an anti-parallel coupling layer 704. However, as described above, although an AP coupled structure preferably has at least two ferromagnetic sub-layers separated by an anti-parallel coupling layer, it may include additional layers, depending on the desired embodiment. Therefore, it should be noted that although the upper shield 520 is illustrated as having a specific number of layers, in other embodiments, the AP coupled structure of the upper shield 520 may include at least two layers, at least three layers, multiple layers, etc., depending on the desired embodiment. Moreover, according to different approaches, the ferromagnetic sub-layers 702, 706 and/or anti-parallel coupling layer 704 of the upper shield 520 anti-parallel coupling layer may include any of the designs described and/or suggested above.

With continued reference to FIG. 7, a second AFM layer 708 is illustrated as being positioned above the layers of the upper shield 520. According to different approaches, the second AFM layer 708 may have the same or similar construction as AFM layer 508. Thus, the second AFM layer 708 may include any of the approaches described above with reference to the dimensions and/or materials of the AFM layer 508. However, in other approaches, the second AFM layer 708 may include different materials and/or dimensions as would be appreciated by one skilled in the art upon reading the present description. Furthermore, additional layers may be formed above the second AFM layer 708 depending on the desired embodiment.

Similarly, according to different approaches, the ferromagnetic sub-layers 702, 706 and/or the anti-parallel coupling layer 704 may have the same as or similar construction as any of the sub-layers 602, 606, 608, 612 and/or anti-parallel coupling layers 604, 610 respectfully, described above with reference to the various approaches associated with the magnetic head 600 of FIG. 6.

Referring still to FIG. 7, according to preferred approaches, the second AFM layer 708 may be directly magnetically coupled to the upper shield 520. Thus, according to the present description, the second AFM layer 708 may have a magnetic orientation substantially parallel to a magnetic orientation of the upper ferromagnetic sub-layer 706 of the upper shield 520, i.e., oriented in substantially the same direction, and preferably within 5 degrees of each other, but could be higher or lower depending on the desired embodiment.

According to yet another illustrative embodiment, side shields may be incorporated in conjunction with any of the magnetic heads described above. In such preferred embodiments, the upper shield may provide added stability to the magnetic orientation of the side shields.

Figure 8:
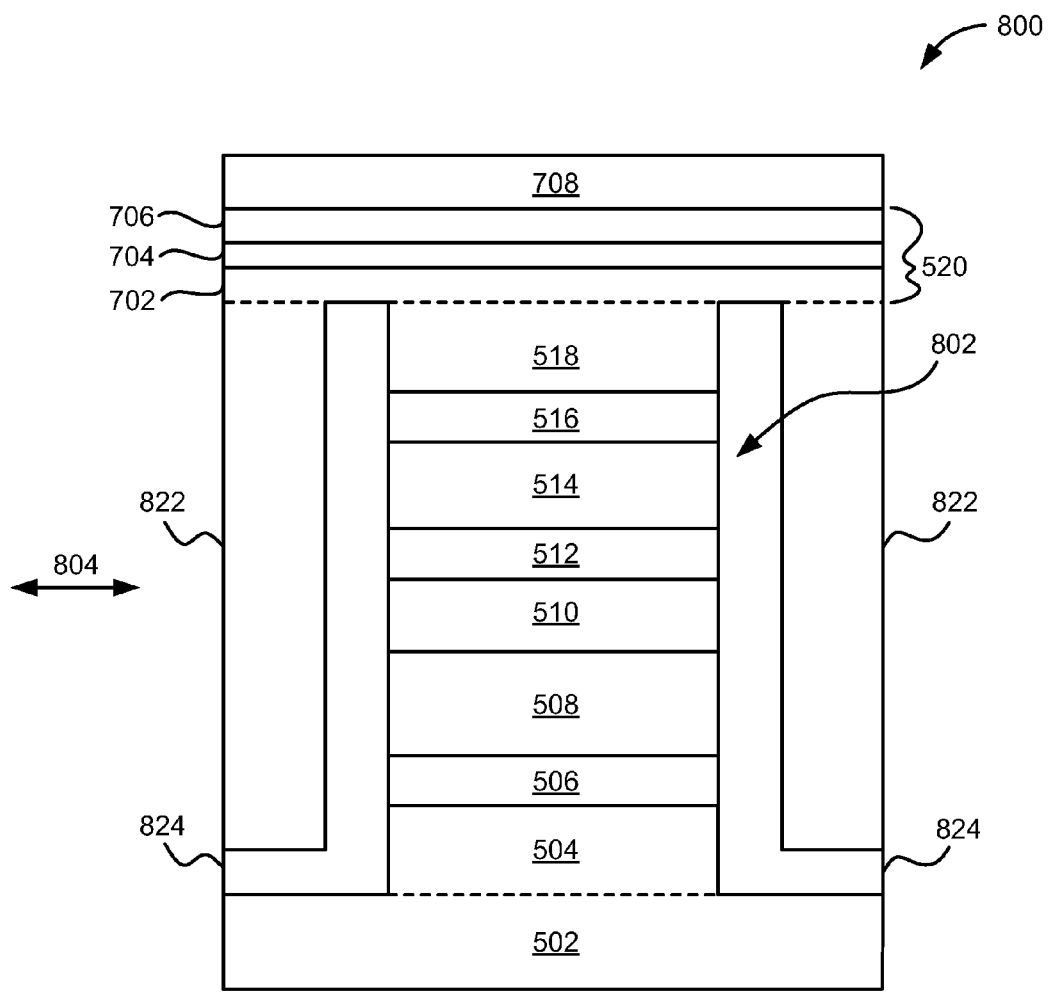
FIG. 8 is a partial cross-sectional view of a magnetic head according to one embodiment.

Referring now to FIG. 8, the magnetic head 800 includes a lower shield 502 and an underlayer 504 above the lower shield 502. Additionally, the magnetic head 800 includes an optional nonmagnetic spacer layer 506, antiferromagnetic (AFM) layer 508, reference layer 510, spacer layer 512, and free layer 514 positioned above the underlayer 504. A cap layer 518 is also included above the free layer 514, and preferably separated therefrom by a nonmagnetic spacer layer 516.

An upper shield 520 may additionally be positioned above the cap layer 518. In various approaches, the upper shield 520 may have a single layer, or multiple layers. In the illustrative embodiment shown, the upper shield has two ferromagnetic sub-layers 702, 706 separated by an anti-parallel coupling layer 704. Moreover, as illustrated in FIG. 8, a second AFM layer 708 is illustrated as being positioned above the layers of the upper shield 520. According to different approaches, the second AFM layer 708 may be the same or similar as AFM layer 508. It should be noted that the magnetic head 800 illustrates a variation of the embodiment of FIG. 7, and therefore various components of FIG. 7 have common numbering with those of FIG. 6. As mentioned above, common numbering is in no way intended to suggest limitations on any embodiment of the invention, but rather is intended to include any of the approaches described and/or suggested in connection with the other FIGS. herein.

With continued reference to FIG. 8, the side shields 822 may be included in conjunction with the magnetic head 800. According to an illustrative embodiment, the side shields 822 are depicted as being positioned laterally to the free layer 514 in a cross track direction 804.

The side shields 822 may include a soft magnetic material, such as those listed above, and one or more seed layers such as Ta or Ru. In preferred approaches, the side shields 822 may be directly magnetically coupled to the upper shield 520, thereby preferably increasing the stability of the side shields 822, e.g., while reading data. In some approaches, a magnetic seed layer may be used to form the side shields. Additionally, in various approaches, the side shields 822 may include a high spin orbit coupling material, according to any of the approaches described above.

According to different approaches, the side shields 822 may be formed using sputtering, plasma vapor deposition PVD, chemical vapor deposition CVD, etc., or any of the other methods described above with reference to the formation of the upper and/or lower shields 520, 502. Thus, forming the side shields 822 may include co-depositing a ferromagnetic material and/or a high spin orbit coupling material from the same (e.g., a single) target, different targets (e.g., two distinct targets), etc.

As described above, according to different approaches, the upper shield 520 may be a single layer, an exchange coupled ferromagnet (e.g., a ferromagnet coupled to an antiferromagnet such as IrMn, PtMn, etc.), a synthetic antiferromagnet, etc., and/or combinations thereof. Moreover, according to different approaches, each of the side shields 822 may or may not include the same or similar material as the upper shield 520.

Additionally, insulation layers 824 may be added, e.g., to electrically decouple the side shields 822 from the cap layer 518 and the layers therebelow. Thus, as shown in FIG. 8, according to a preferred approach, the insulation layers 824 may be positioned between the side shields 822 and the sensor stack 802.

According to various approaches, the insulation layers 824 may include any conventional insulating materials, as would be appreciated by one skilled in the art upon reading the present description. Moreover, the insulation layers 824 may be formed using a sputtering process, but is not limited thereto.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification. According to the various approaches described and/or suggested herein, any of the aforementioned embodiments may be implemented with read sensors of types known in the art, e.g., Tunnel Magnetoresistance (TMR) sensor, Giant Magnetoresistance (GMR) sensor, scissor sensor, STO sensor, etc., depending on the desired embodiment.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
    an underlayer;
    a first nonmagnetic spacer layer above the underlayer;
    a free layer above the first nonmagnetic spacer layer;
    a second nonmagnetic spacer layer above the free layer; and
    a cap layer above the second nonmagnetic spacer layer;
    wherein at least one of the cap layer and the underlayer comprises a soft ferromagnetic material and a high spin orbit coupling material.

2. The magnetic head as recited in claim 1, wherein the high spin orbit coupling material is selected from a group consisting of Dy, Tb, Ir, Pt, Pd, Os, Ho, Gd, Er, W, Rh, and alloys containing said materials.

3. The magnetic head as recited in claim 1, further comprising an upper shield, wherein the upper shield is directly magnetically coupled to the cap layer, the cap layer having the high spin orbit coupling material.

4. The magnetic head as recited in claim 3, further comprising side shields positioned laterally to the free layer in a cross track direction, wherein the side shields comprise a soft magnetic material, the side shields being directly magnetically coupled to the upper shield.

5. The magnetic head as recited in claim 3, further comprising an antiferromagnetic layer magnetically coupled to the upper shield.

6. The magnetic head as recited in claim 3, wherein the upper shield includes an anti-parallel coupled structure having at least two ferromagnetic sub-layers separated by an anti-parallel coupling layer.

7. The magnetic head as recited in claim 1, further comprising a lower shield, wherein the lower shield is directly magnetically coupled to the underlayer, the underlayer having the high spin orbit coupling material.

8. The magnetic head as recited in claim 1, wherein the high spin orbit coupling material is present in the at least one of the cap layer and the underlayer at 1 to about 10 at %.

9. The magnetic head as recited in claim 1, wherein the ferromagnetic material has the high spin orbit coupling material interspersed therein.

10. The magnetic head as recited in claim 1, wherein the ferromagnetic material and the high spin orbit coupling material are present in alternating layers in a laminate structure.

11. The magnetic head as recited in claim 1, wherein the at least one of the cap layer and the underlayer is about 10 to about 60 angstroms thick.

12. The magnetic head as recited in claim 1, wherein the soft ferromagnetic material is selected from a group consisting of Ni, Fe, Co, and alloys containing said materials.

13. The magnetic head as recited in claim 1, wherein the at least one of the cap layer and the underlayer includes an anti-parallel coupled structure having at least two ferromagnetic sub-layers separated by an anti-parallel coupling layer.

14. A magnetic data storage system, comprising:
    at least one magnetic head as recited in claim 1;
    a magnetic medium;
    a drive mechanism for passing the magnetic medium over the at least one magnetic head; and
    a controller electrically coupled to the at least one magnetic head for controlling operation of the at least one magnetic head.

15. A method of making the magnetic head of claim 1, the method comprising:
    forming at least one of the underlayer and the cap layer by co-depositing the ferromagnetic material and the high spin orbit coupling material from different targets.

16. A method of making the magnetic head of claim 1, the method comprising:
    forming at least one of the underlayer and the cap layer by co-depositing the ferromagnetic material and the high spin orbit coupling material from a same target.

17. A method of making the magnetic head of claim 1, the method comprising:
    forming at least one of the underlayer and the cap layer by sequentially depositing the ferromagnetic material and the high spin orbit coupling material, thereby forming a laminate structure.

18. A magnetic head, comprising:
    an underlayer;
    a first nonmagnetic spacer layer above the underlayer;
    a free layer above the first nonmagnetic spacer layer;
    a second nonmagnetic spacer layer above the free layer; and
    a cap layer above the second nonmagnetic spacer layer;
    wherein at least one of the cap layer and the underlayer comprises a soft ferromagnetic material and a high spin orbit coupling material,
    wherein the high spin orbit coupling material is selected from a group consisting of Dy, Tb, Ir, Pt, Pd, Os, Ho, Gd, Er, W, Rh, and alloys containing said materials,
    wherein the high spin orbit coupling material is present in the at least one of the cap layer and the underlayer at 1 to about 10 at %.

19. The magnetic head as recited in claim 18, wherein the at least one of the cap layer and the underlayer includes an anti-parallel coupled structure having at least two ferromagnetic sub-layers separated by an anti-parallel coupling layer.

20. A magnetic data storage system, comprising:
    at least one magnetic head as recited in claim 18;
    a magnetic medium;
    a drive mechanism for passing the magnetic medium over the at least one magnetic head; and
    a controller electrically coupled to the at least one magnetic head for controlling operation of the at least one magnetic head.

* * * * *